(12) United States Patent
Helzerman (10) Patent No.: US 6,901,372 B1
(45) Date of Patent: May 31, 2005

(54) QUALITY OPERATING SYSTEM

(75) Inventor: Thomas Henry Helzerman, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/543,227

(22) Filed: Apr. 5, 2000

(51) Int. Cl.[7] .............................................. G06F 17/60
(52) U.S. Cl. ........................................................ 705/7
(58) Field of Search ................................... 705/1, 7–10

(56) References Cited

U.S. PATENT DOCUMENTS

| | | | | |
|---|---|---|---|---|
| 5,249,120 A | * | 9/1993 | Foley .............................. | 705/1 |
| 5,280,425 A | * | 1/1994 | Hogge .......................... | 712/300 |
| 5,765,140 A | * | 6/1998 | Knudson et al. ............... | 705/9 |
| 5,787,283 A | * | 7/1998 | Chin et al. .................... | 717/101 |
| 6,393,406 B1 | * | 5/2002 | Eder .............................. | 705/7 |
| 2003/0004766 A1 | * | 1/2003 | Sandoval et al. .............. | 705/7 |

FOREIGN PATENT DOCUMENTS

| | | | | |
|---|---|---|---|---|
| JP | 11-219346 A | * | 8/1999 | ........... G06F/17/00 |

OTHER PUBLICATIONS

Duncan, William R. A Guide to the Project Management Body of Knowledge. PMI Standards Committee, 1996.*
Kerzner, Ph. D., Harold. Project Management: A Systems Approach to Planning, Scheduling, and Controlling (5th ed). Van Nostrand Reinhold, pp. 567–1151, 1995.*
"FGTI—Best Practice Replication Process (BPR) Web Site" (retrieved from http://www.fordbetterideas.com/tc/main/featuredtech/best.htm on Aug. 22, 2003).*
Anthes, "Learning How to Share," Computerworld, vol. 32, No. 8, pp. 75–77, Feb. 23, 1998.*
Dixon, "The Changing Face of Knowledge," Learning Organization, vol. 6, No. 5, pp. 212–216, 1999.*
"Ford Connecting to Consumers Via E–Business," PR Newswire, p. 8304, Sep. 15, 1999.*
Anthes, "Defending Knowledge," Computerworld, vol. 32, No. 7, pp. 41–42, Feb. 16, 1998.*
"RealNetworks Announces RealSystem G2 for Corporate Intranets," PR Newswire, p. 0428LATU076, Apr. 28, 1998.*
Kienzle, "Working on the Web," Video Systems, Aug. 1999.*
Papadakis et al., "Inspection Decision Theory: Deming Inspection Criterion and Time–Adjusted Rate–of–Return Compared," Engineering Costs and Production Economics, vol. 13, No. 2, pp. 111–124, Jan. 1988.*
Coffman, "Nanothane Rest Blocks Improve Ford Quality," Automotive Industries, vol. 169, No. 4, p. 177(2), Apr. 1989.*
Ford Motor Company's "Best Practice Replication Manual" (copyright 2002; Applicant states that "the manual remains substantially unchanged since its original development in 1996").*

* cited by examiner

*Primary Examiner*—Susanna M. Diaz
(74) *Attorney, Agent, or Firm*—David B. Kelley (57) ABSTRACT

A quality operation system or method 10 for performing manufacturing projects 12. The method 10 efficiently organizes the project into five phases including a concept proposal phase 24, a concept feasibility phase 26, a manufacturing concept ready phase 28, a manufacturing implementation ready phase 30, and a replication phase 32.

20 Claims, 9 Drawing Sheets

QUALITY OPERATING SYSTEM

FIELD OF THE INVENTION

This invention generally relates to a quality operating system and more particularly, to a quality operating system or method for developing and performing manufacturing projects.

BACKGROUND OF THE INVENTION

Products, such as automotive vehicles and vehicle systems and components, are typically developed, manufactured and/or produced, according to a certain project or process. These types of development and manufacturing projects are often complex and include many different steps or phases. Without a proper quality operating system and/or method for coordinating and completing each of the phases of a project, the quality and/or timing of the project may be adversely effected. As a result, the completion and/or implementation of the project may be delayed, and the end result (e.g., the resulting manufactured product) may have certain defects.

There is therefore a need for a quality operating system or method for developing and performing manufacturing projects which allows for the timely and proper development, completion and implementation of the manufacturing projects.

SUMMARY OF THE INVENTION

It is a first object of the invention to provide a quality operating system or method for developing, implementing and performing a manufacturing project.

It is a second object of the invention to provide a quality operating system or method for developing and performing a manufacturing project which efficiently coordinates various phases of a manufacturing project.

It is a third object of the invention to provide a quality operating system or method for developing and performing a manufacturing project which sub-stantially ensures that the manufacturing project is completed in a timely and proper manner.

According to a first aspect of the present invention, a method is provided for performing a manufacturing project. The method includes the steps of: providing a concept proposal to develop processes to manufacture a desired product; conducting a concept feasibility procedure, effective to demonstrate that a certain technology is feasible to manufacture the desired product; performing a manufacturing concept ready procedure, effective to verify that the certain technology is capable of manufacturing the desired product under simulated conditions; performing a manufacturing implementation procedure, effective to verify that the certain technology is functionally sound and meets certain quality and cost criteria; and performing a replication procedure, effective to implement multiple applications of the certain technology within other manufacturing processes.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
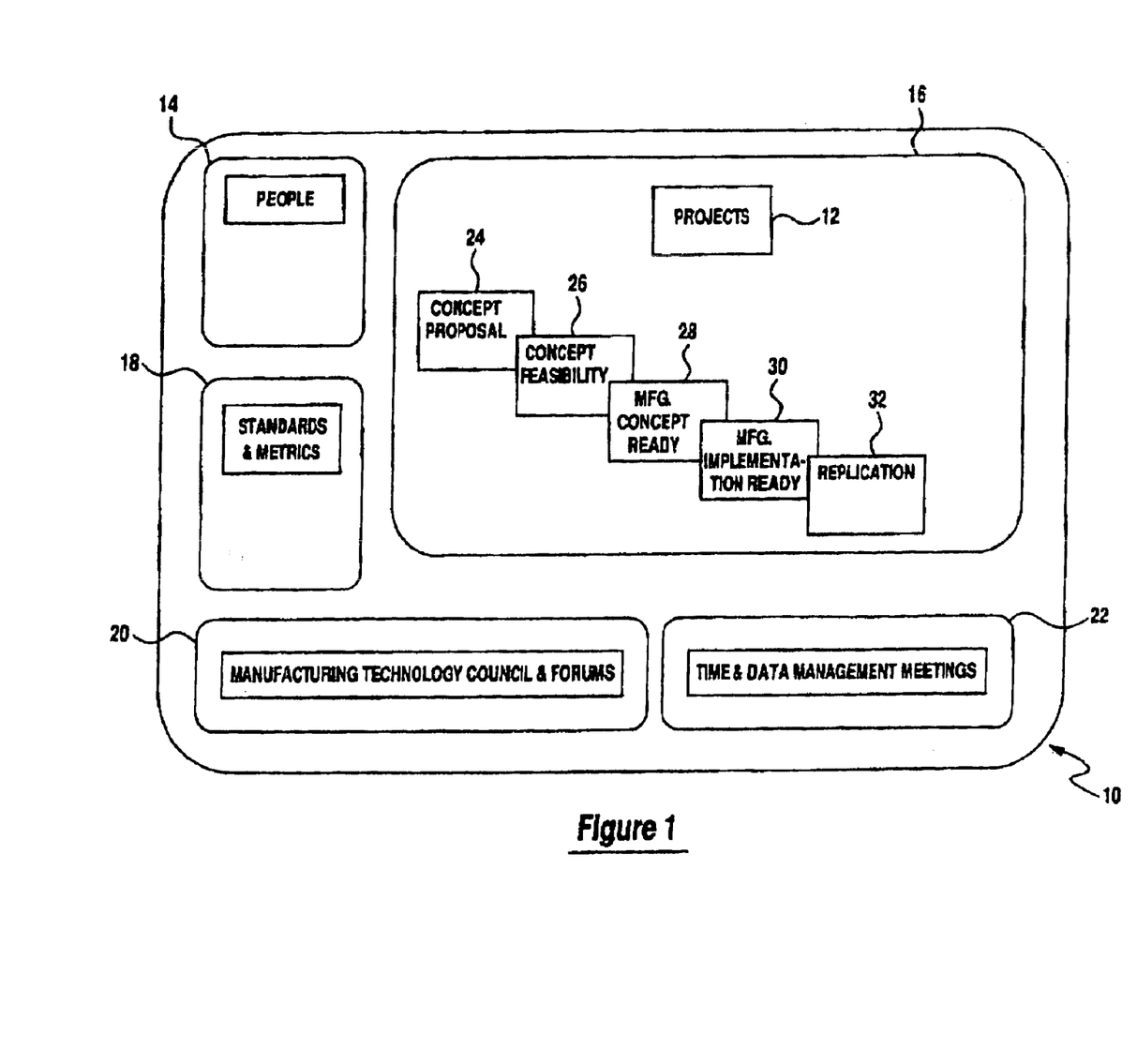
FIG. 1 is a block diagram illustrating a quality operating system or method for developing and performing a manufacturing project according to the preferred embodiment of the present invention.

Referring now to FIG. 1, there is shown a quality operating system, method or methodology 10 for developing, performing and executing manufacturing projects 12 within a company. Particularly, as explained more fully and completely below, method 10 is effective to develop, coordinate and implement various phases of a manufacturing project and to substantially ensure that the manufacturing project is completed in a timely, efficient and proper manner. In one non-limiting embodiment, projects 12 relate to the manufacture of automotive vehicles. System or method 10 includes a method 14 for providing people to perform and execute the project 12; a method 16 for developing, organizing and implementing the project in different phases 24–32; a method 18 for establishing standards and metrics; a method 20 for utilizing manufacturing technology councils and forums; and a method 22 for performing time and data management meetings.

Figure 2:
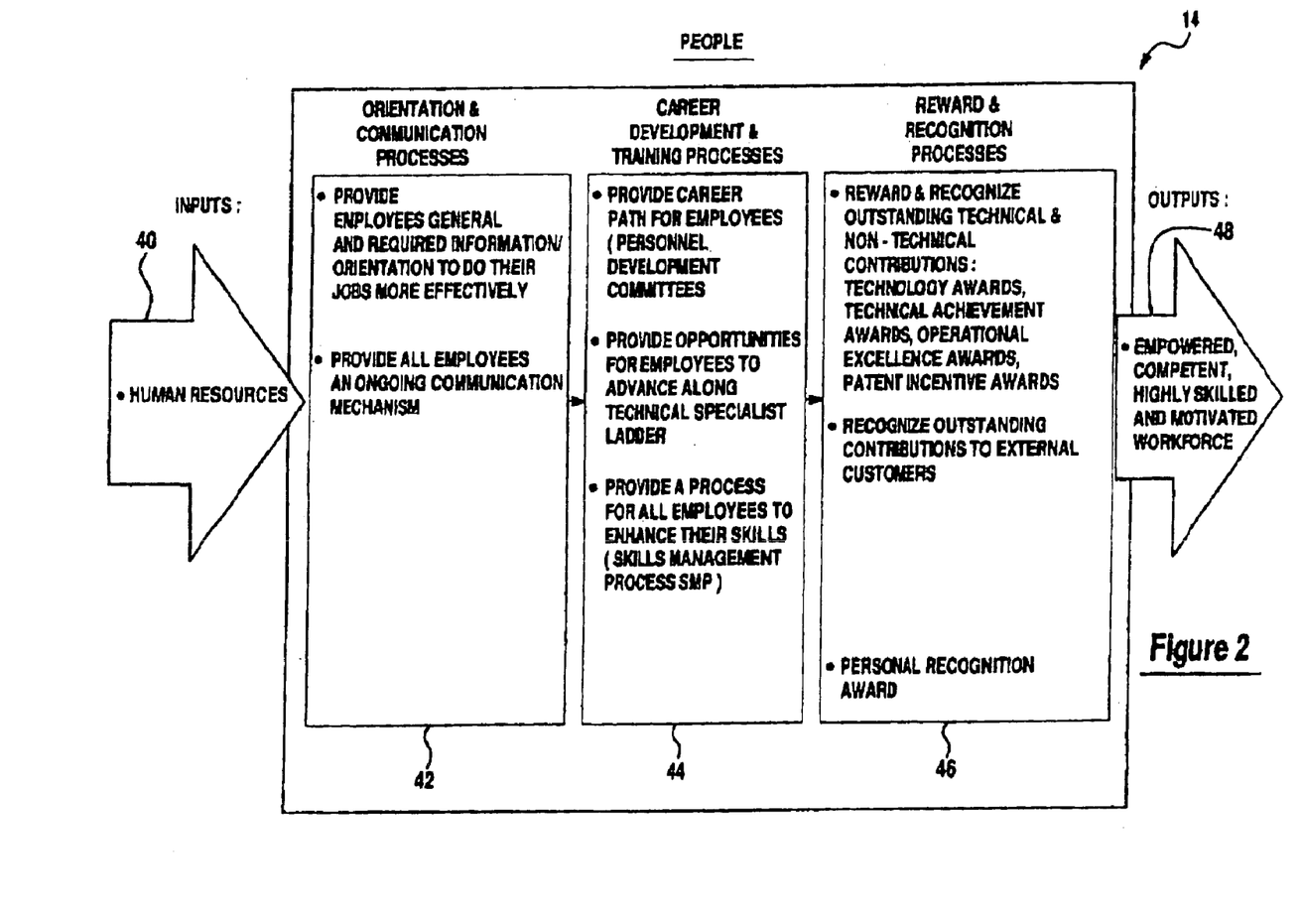
FIG. 2 is a block diagram illustrating a method for providing people for a workforce which is utilized by the system or method shown in FIG. 1.

Referring now to FIG. 2, there is shown a method 14 for providing a skilled and competent workforce for performing a project 12. In block or step 40, people, employees or personnel, who act as the "input" for this method 14, are selected and provided by a human resources department or committee. In block or step 42, the personnel are provided with orientation and communication processes. Particularly, the selected or chosen employees are provided with general and required job orientation information. For example and without limitation, the employees are instructed how to most effectively and/or efficiently perform their respective jobs, duties and/or responsibilities. Additionally, the employees are provided with an ongoing communication mechanism in which they can tender any questions, concerns or other matters regarding their employment and/or job duties, and receive prompt and accurate information in response thereto.

In block or step 44, employees engage in career development and training processes. Particularly, career path information is provided to employees so that they are aware of their potential for advancement within the company and the goals that they will need to meet to achieve the advancement. In the preferred embodiment, personnel development committees are formed to assist in providing the employees with career path information. Employees are further provided with opportunities to advance along their career paths and become technical specialists by meeting certain predetermined objective performance standards and/or by achieving certain goals. Additionally, processes (e.g., career advancement and training classes) are provided for all employees to enhance their respective skills.

Block or step 46 represents certain employee reward and recognition processes. In block or step 46, employees are rewarded and recognized for technical and non-technical contributions. For example and without limitation, deserving employees may earn technology awards, technical achievement awards, operational excellence awards, and patent incentive awards. Employees may also be recognized and/or rewarded for outstanding contributions to external customers and for personal recognition.

The "output" or result of method 14 is an empowered, competent, highly skilled and motivated workforce, as illustrated in block 48. By use of this workforce, projects can be developed, implemented and performed more quickly, efficiently, and with a higher degree of quality.

As shown best in FIG. 1, method 16 "carries out" or executes projects 12 in five stages or phases 24–32. Particularly, the project phases are the concept proposal phase 24, the concept feasibility phase 26, the manufacturing concept ready phase 28, the manufacturing implementation ready phase 30, and the replication phase 32. The below-delineated tasks and methods which are described for each phase 24–32, are considered and/or adjusted for appropriateness and applicability in each project. The following general processes, methods and requirements are utilized within methods 10, 16 for implementing the project(s) 12.

At the completion of each project phase, a milestone review is conducted to insure that all affected parties are informed about project results and deliverables, critical delivery dates, actions required for completion, and other project issues. Meeting agenda, attendance, minutes, assignments, and target dates are required and generated at each of the milestone reviews.

Furthermore, a project timing plan is maintained for every project. The timing plan includes, as a minimum, the individual project metrics (described below) and milestone reviews. Detailed tasks for each phase, however, may differ from project to project. During concept proposal, the overall timing is estimated for all project phases and shown as a "baseline" on sub-sequent milestone reviews. As remaining phases through the manufacturing implementation ready phase 30 are completed, detailed timing for the next successive phase is determined and prepared.

Project leaders (e.g., individuals and/or employees in charge of projects) are responsible for maintaining records while a project is active. These maintained records document and/or evidence that individual project metrics have been addressed; that tasks for each project phase have been considered; and that appropriate outputs have been delivered. Project leaders, project management, and team members are also responsible to ensure that all safety issues are addressed during each project phase.

Documentation for closed projects is also compiled, acquired and maintained. Particularly, upon closure of a project, the completed timing chart and records of the individual project metrics are filed with and maintained by a document control coordinator or department.

Each project leader also maintains a chronological record identifying and documenting changes affecting project records, including review and approval of team members as appropriate. Additionally, all "test" parts (e.g., non-production parts) used for developmental purposes are labeled in accordance with a numbering or indexing procedure (e.g., each part is given a specific identification or reference number).

Figure 3:
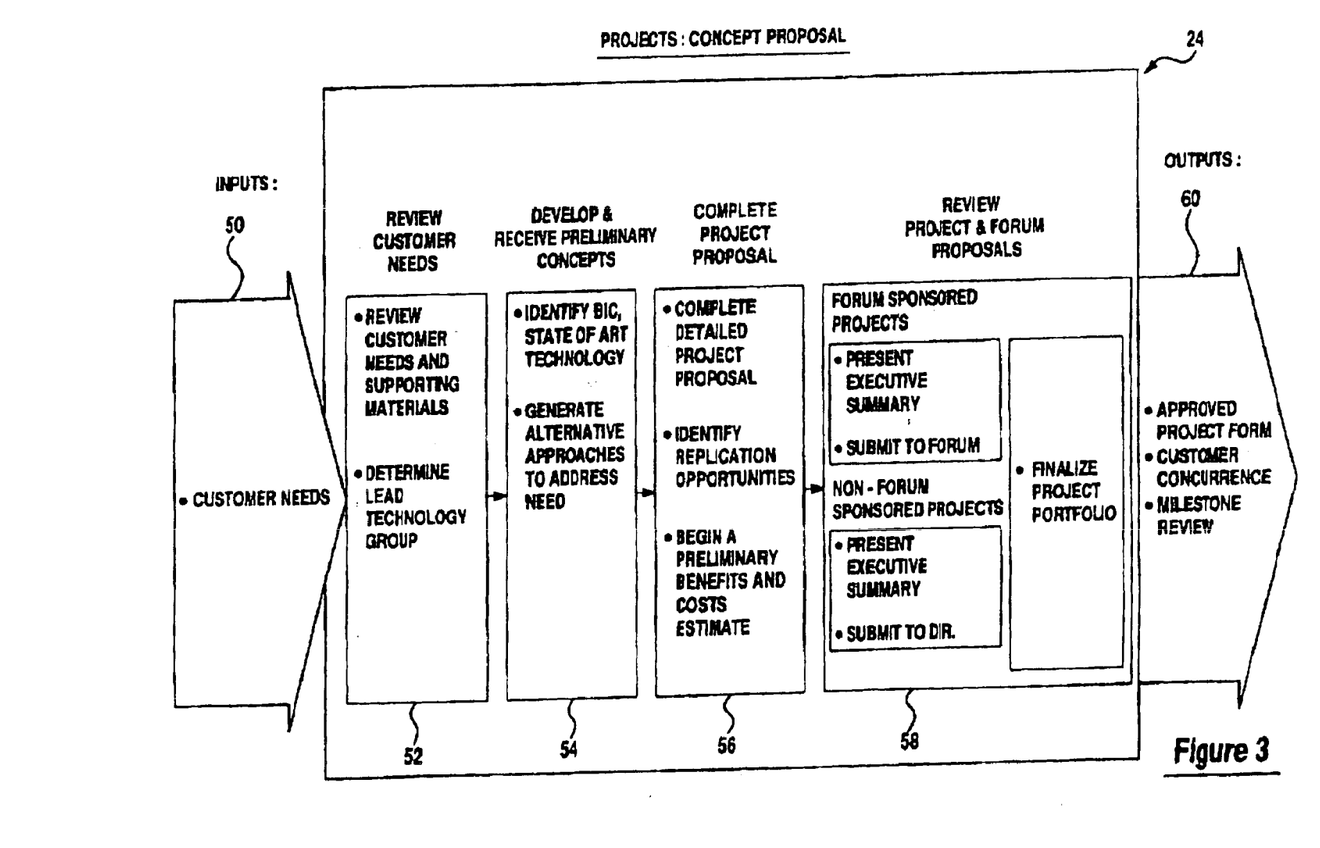
FIG. 3 is a block diagram illustrating a concept proposal phase performed in the system or method shown in FIG. 1.

Referring now to FIG. 3, there is shown one non-limiting embodiment of the project concept proposal phase 24. The concept proposal phase 24 is a plan to develop manufacturing technologies, processes or methodologies. This phase 24 begins when a customer need has been defined, and concludes when the project has been approved for concept feasibility analysis. In block or step 50, customer needs and/or desires, which act as the "input" for this phase 24, are selected and/or acquired in a conventional manner (e.g., in the manners described below). In step 52, project leaders, managers and other personnel within the company's advanced manufacturing technology development ("AMTD") department review customer needs and/or desires and any supporting material which evidence or document the customer needs and desires. In the preferred embodiment, a meeting is conducted to discuss and review customer needs and supporting material. Customer needs may come from several sources including: current systemic concerns requiring action to prevent recurrence; prioritized corporate "wants" which are identified by the below-described forums and technology council 20; emerging technology opportunities identified outside the forum process 20; requirements generated by government regulation; and/or changes in the business climate or unanticipated operational problems. Project leaders and managers further evaluate the impact the proposed project may have on the consumer. Supporting material may include technology "roadmaps" (e.g., the timing and migration of enabling technologies to support a technology strategy), technology cycle plans, competitive assessments, "measurables" (including quality indicators such as warranty and survey information), and affordable targets.

Project leaders and managers next select or identify a "lead" technology group for each identified customer need. For example and without limitation, project leaders and managers identify and/or select lead engineers and teams or individuals who will be responsible for preparing and implementing the concept proposal and project. The "output" or result of step 52 is the assignment(s) for concept proposals development.

In step 52, the preliminary concepts are received and developed. The lead technology group (i.e., the group in charge of preparing and implementing the proposal and project) begins by identifying the "best in class" technology (i.e., the existing product or process which clearly represents superior value to the customer, relative to all similar products or processes) and the "state-of-the-art" technology (i.e., the latest and most sophisticated or advanced stage of a technology, art or science existing at the time of manufacture). For example and without limitation, within the customer need of interest, the lead technology group identifies the technology currently in use for the application/need that represents superior value to the customer, relative to all similar processes. The lead technology group further determines what technologies being developed offer the greatest advantage to the company.

The lead technology group or team then generates alternative approaches to address the customer need. Particularly, the group analyzes and determines alternative technologies or approaches which hold promise for the need. The group then analyzes all of the potential and viable approaches to estimate the amount of company development (including company resources and time) required to address the need by use of each of the various potential approaches.

The group next assesses the technical merit of each approach. Particularly, the group compares different technical approaches in terms. of their ability to solve the basic issue within a manufacturing environment. The group reviews preliminary concepts and selects the most promising concepts based upon their analysis.

The group or team then determines whether the recommended/selected proposal concept requires any new or emerging manufacturing technologies, processes or methodologies, or requires any existing manufacturing technologies, processes or methodologies for which major change, representing significant risk and further development is required for implementation. The group further reviews data to determine if information and measurables are available to complete a list of mandatory requirements.

The group prepares concept proposals and completes a standard worksheet or form for each selected concept proposal. In the preferred embodiment of the invention, the worksheet or form is in an electronic file or format, and is selectively communicated to relevant personnel, departments (e.g., the "AMTD") and customers in a conventional manner. The group further uses the worksheet to establish the resources and skills required, and more particularly, to determine the internal level of commitment and the organizational (internal and external) needs, and to select and identify resources (facility and people) to support the concept proposals.

Finally, prior to proceeding to step 56, the group obtains concurrence and commitment to proceed. In the preferred embodiment of the invention, this is done by contacting any customer sponsor(s) (where applicable), presenting the completed form(s) or worksheet(s) to ensure the proposal aligns with customer needs and modifying the proposal as required, and obtaining management concurrence for non-customer sponsored proposals.

The "output" or result generated from step 54 is a "preliminary concept proposal". In block or step 56, the group completes the project proposal. Particularly, the group finalizes project workplans and refines estimates for required resources and project benefits. The group then enters project information into a database and submits the information to an activity coordinator. The activity coordinator ensures that, as applicable, the projects are consistent with certain timing rules, guidelines and/or standards.

Next, replication opportunities are identified. For example and without limitation, the group reviews other company facilities and/or activities, worldwide, for additional applications. The group further reviews any potential or identified replication opportunities with the primary customer.

The group then performs a preliminary benefit and cost estimate. Particularly, the group estimates the benefits to be realized once the project has been fully implemented and replicated; and the facility and tooling costs necessary to develop, "prove out", implement, and replicate the project.

The "output" or result generated from step 56 is a completed and submitted project proposal for each project. In the preferred embodiment of the invention, the project proposals are completed and submitted on a standard form or according to a standard format.

In block or step 58, ("AMTD") managers and project leaders review the project proposals. The employees in charge of preparing the proposals schedule a meeting to be attended by affected "AMTD" managers and project leaders (and by a director if the project concerns a "non-forum" originated want). Each lead project engineer summarizes their respective project using executive summary fields, and identify opportunities for crossproject synergy. The groups submit the proposals for review to the relevant forum for "forum sponsored" projects, and to a director for "non-forum sponsored" projects. Finally, in step 58, a project portfolio is compiled which contains all of the recommended projects which are returned from the forums. The groups then verify budget and headcount availability for the entire portfolio.

The "output" or result 60 from phase 24 is a customer and company approved project portfolio with allocated budgets and assigned headcounts. The technology groups and management then conduct a milestone review to review project status and milestone deliverables to insure adherence to the quality operating system or method 10. "AMTD" department managers, project leaders, project team members, customers, and employee representatives all participate in the milestone review.

Figure 4:
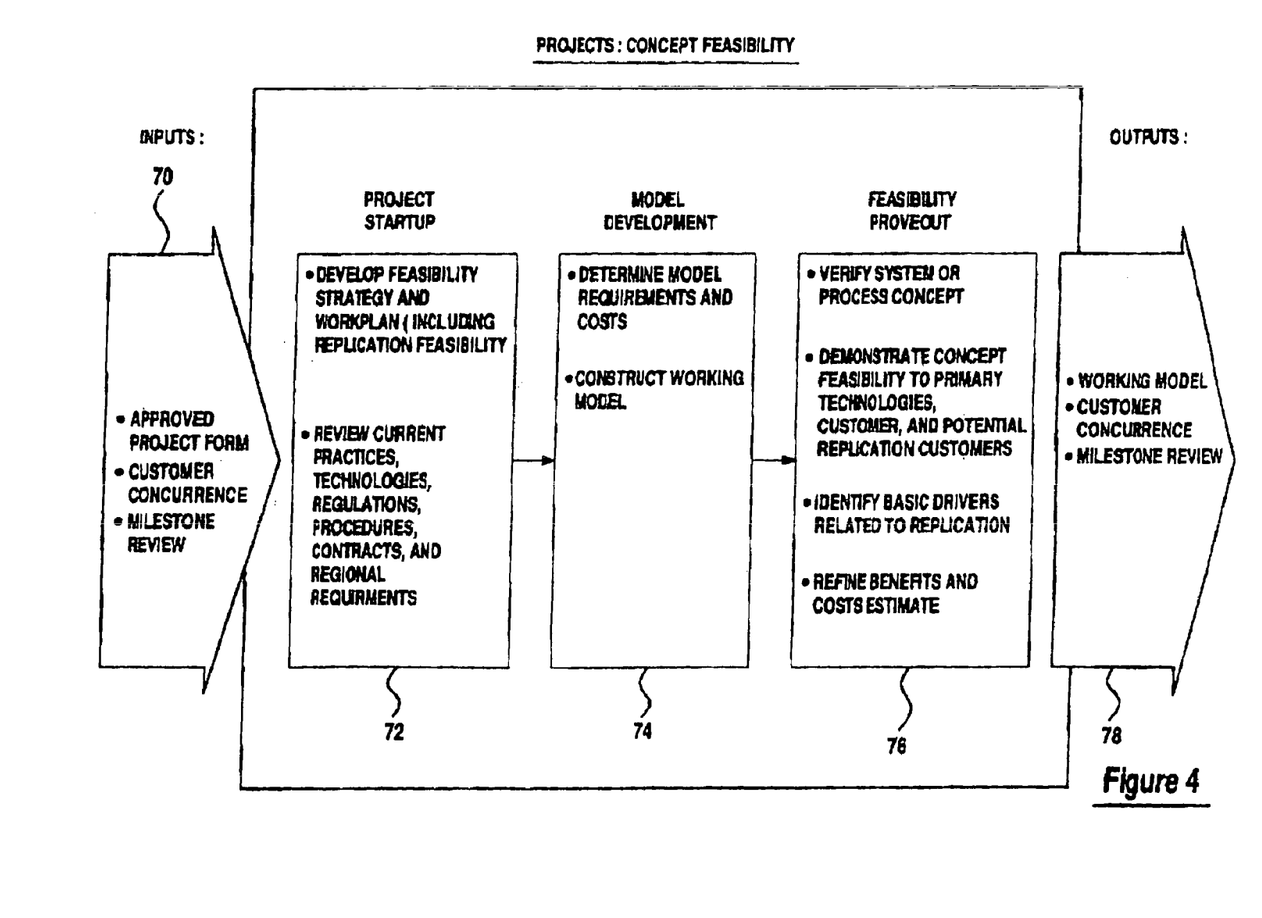
FIG. 4 is a block diagram illustrating a concept feasibility phase performed in the system or method shown in FIG. 1.

Referring now to FIG. 4, there is shown one non-limiting embodiment of the concept feasibility phase 26 of project 12. The concept feasibility phase 26 is the process of demonstrating that an existing technology may be applied, or a new technology may be developed, to improve the way the company produces the product. During this phase 26, a working model is developed to demonstrate the ability of the technology to provide the desired functionality and customer requirements through a certain process. This phase 26 begins when the project has been approved, and concludes when the customer concurs with demonstrated results of the model. In block or step 70, the "output" from phase 24 (e.g., the approved project) serves as the "input" for this phase 26. In step 72, the interested group or personnel (e.g., the group or employees in charge of the project) perform the project startup step or "sub-phase". The group begins by developing a feasibility strategy and workplan (including replication feasibility). Particularly, the group organizes the project team, considering the relevant customer, suppliers, universities, company personnel, pre-program engineering, employee representatives, and other manufacturing/design activities. The group then refines the project timing plan or chart as required, with appropriate milestones, including periodic reviews with customer and company management. The group also assigns specific team member responsibilities to achieve each element of the timing plan, and reviews the timing plan with company management and the customer. The group then obtains customer consent for the workplan.

In step 72, the group further reviews current practices, technologies, regulations, contracts, and regional requirements. For example and without limitation, the group reviews the "state-of-the-art" for the proposed technologies or process. If necessary, the group performs a more "in-depth" benchmark of company and industry practices and considers the relationship of customer procedures if applicable. The group acquires team member training as required.

Furthermore, the group considers the need for intellectual property rights, confidentiality agreements, patent searches, and invention disclosures, and determines the applicability of existing local, state, and federal regulations and regional requirements with respect to industrial hygiene, health and safety, ergonomics, environmental exposure, and any other relevant legal or regulatory factors. Finally, the group determines applicability of company procedures and business contracts related to labor relations, suppliers, and proposed technology.

The "output" or result from step or "sub-phase" 72 is a review of "best-in-class" targets and of the "stateof-the-art", and a compilation of applicable regulations, contracts, and legal opinions. The next step or sub-phase 74 is the model development sub-phase, which consists of determining model requirements and costs and constructing a working model.

The group or team begins determining model requirements and costs by identifying significant and critical characteristics of the system or process required to implement the project. The group outlines fundamental elements for a working model that may consist of a prototype, preliminary, or laboratory system, equipment, process, charts, software, or other relevant elements. The working model is then designed and includes concept sketches, block diagrams, written idea descriptions, flow charts, detailed drawings, schematics, assembly prints, and any other appropriate elements. Finally, the group or team reviews the developed processor model proposal with the customer for approval.

The group then constructs the approved working model of the desired product or system to be manufactured or produced. Particularly, the group acquires or develops the approved model components; issues purchase orders as required; develops a measurement or evaluation system, and obtains test components. The group further configures, assembles, and/or integrates sub-components to build a working model of the desired product or system. Finally, the group functionalizes and/or tests the working model.

The "output" or result from step or "sub-phase" 72 is a working model and a measurement and/or evaluation system. The next step or sub-phase 76 is the "feasibility prove out" model development sub-phase, which consists of verifying the system or process concept, demonstrating concept feasibility, identifying basic drivers, and refining benefits and costs estimates.

The group or team begins sub-phase 76 by verifying the developed system or process concept. Particularly, the group develops a feasibility test timing plan based on critical system parameters and customer requirements; conducts test programs and analyzes data/results versus objectives; establishes causes for any significant shortfalls; and revises or modifies the system as required to address the shortfalls. The "outputs" or results from this verification stage are the verification and quantification of significant system or process characteristics and verification that the system can meet critical customer requirements.

The group then demonstrates the concept feasibility to the primary customer and to potential replication customers. Particularly, the group receives test results and/or working models with the primary customer, company management, and potential replication customers; assesses benefits and risks of proceeding with the project; discusses advisability of continuing project or redirecting efforts; and obtains documented customer concurrence on concept feasibility. In the preferred embodiment, "documentation" of customer concurrence may comprise a note, letter, memorandum or any other tangible evidence of concurrence. The "outputs" or results from this stage are an assessment of project benefits and risks, and documented customer concurrence of feasibility.

The group then identifies basic drivers related to replication. Particularly, as facilities are considered for additional application of the technology, and for unique local requirements such as unions, local codes, regulations, and other circumstances that may be encountered.

Finally, the group or team refines the benefits and costs estimate of the project, as new information becomes available. The "output" or result of this process is a revised benefits and cost estimate.

The "output" or result 78 from phase 26 is a working model and customer concurrence. At this point, the technology groups and management also conduct a milestone review to review project status and milestone deliverables to insure adherence to the quality operating system process 10. "AMTD" department managers, project leaders, project team members, customers, and employee representatives all participate in the milestone review.

Figure 5:
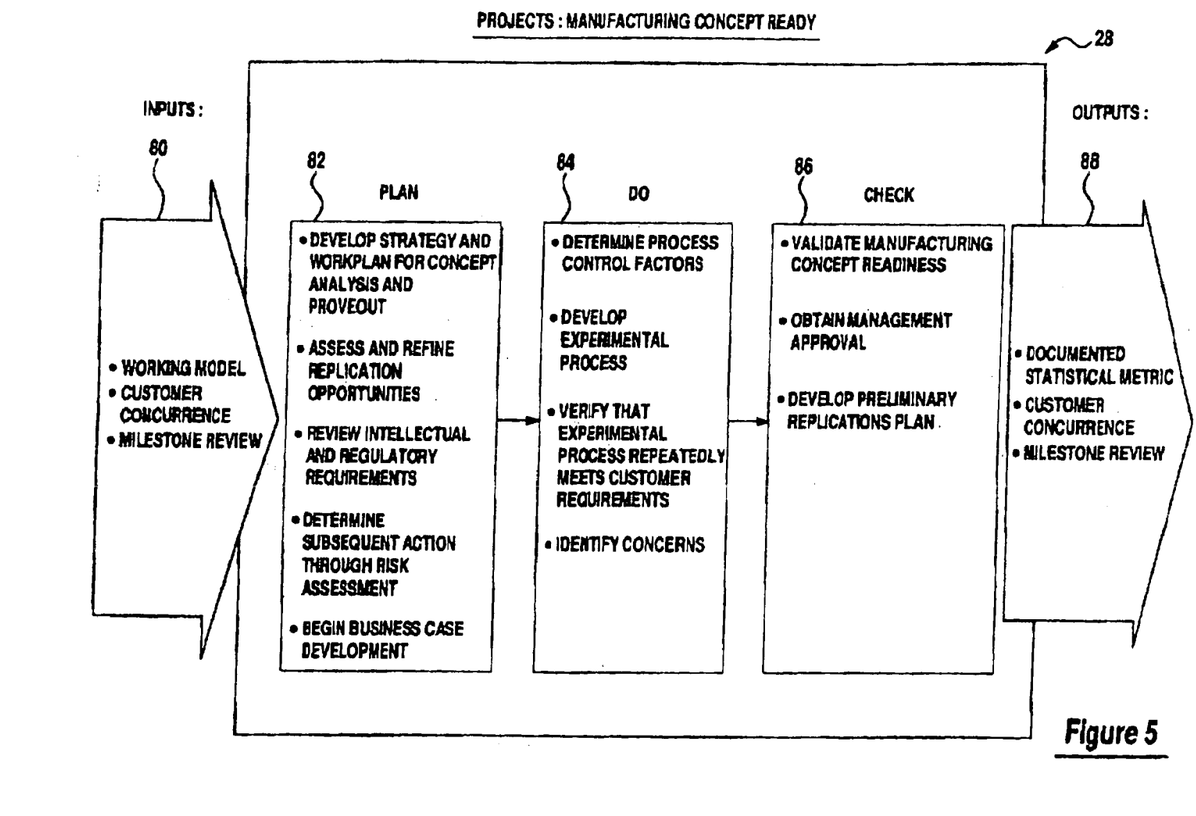
FIG. 5 is a block diagram illustrating a manufacturing concept ready phase performed in the system or method shown in FIG. 1.

Referring now to FIG. 5, there is shown one non-limiting embodiment of the manufacturing concept ready phase 28 of project 12. Manufacturing concept ready phase 28 is the process of verifying and demonstrating that the process developed in the concept feasibility phase 26 of the project 12 is capable of producing products conforming to specifications under conditions simulating those expected during its intended production application while meeting cost and timing requirements. In block or step 80, the "output" from phase 26 (e.g. the working model, customer concurrence, and milestone review) serves as the "input" for this phase 28. In step 82 or the "plan" sub-phase, the group develops strategy and work plan for concept development and prove out; assesses and refines replication opportunities; reviews intellectual and regulatory requirements; determines subsequent action through risk assessment; and begins business case development.

First, the group develops a strategy and workplan for the concept development and prove out. Particularly, the group verifies that funding is committed. The group further reviews customer success criteria using project requirements, targets, assumptions, and constraints. The group then prepares a detailed manufacturing concept ready prove out budget and timing plan, and verifies that cost and timing meet overall program targets and objectives. Finally, the group reviews manufacturing concept ready workplan and obtains team concurrence. The "output" or result of this process is a detailed workplan.

The group then assesses and refines replication opportunities. Particularly, the group reassesses the replication opportunities previously identified from the "output" of the concept feasibility stage. The group refines the initial identification of local requirements for each replication site and provides the outputs of a refined replication site listing, and local requirements for each replication site refined.

The group then reviews intellectual and regulatory requirements. The group begins by reviewing processes and technology for innovation and issue invention and disclosure, or for projected intellectual property rights as appropriate. The group reviews conformance of the process to applicable corporate and government codes, standards, and laws concerning health, safety, environment, and industrial hygiene. The "outputs" or results from this process are invention disclosures and copyright applications.

The group then determines subsequent action through risk assessments. If a production prove out is not required, the group proceeds to the next process or step 84. If a production prove out is required and controlled methodologies are well known, the group proceeds to identify concerns. If controlled methodologies are not known, the group proceeds to determine process control factors in the next step 84.

Before beginning the next step 84, the group begins "business case development". Particularly, the group identifies benefits and sources of savings (e.g., labor, efficiency, material, and any other sources of savings) The group further begins assembling cost and benefits data collection, estimates improvement factors, and estimates the investment required for facilities and tooling.

The group then proceeds to the next step 84 or the "do" sub-phase. The "do" sub-phase 84 includes determining process control factors, developing experimental processes, verify experimental processes, and identifying concerns.

The group first determines process control factors. Particularly, the group analyzes processes and categorizes factors as either control or noise. The group further verifies factor categorization through statistical methodologies. The "output" or result from this process is a known process control and noise factors.

The group then develops experimental processes. For example and without limitation, the group defines operation boundaries based on customer requirements. The group further selects factor settings based on quality, cost, time and requirements. The "output" or result of these processes are production-controlled methodologies, and schedules or techniques.

The group then verifies that experimental processes repeatedly meet customer requirements. Particularly, the group confirms process output at selected settings through statistically significant limited experimental test replication.

The group then identifies concerns. Particularly, the group determines potential failure modes and corresponding safeguards needed for production; develops production procedures to adjust known potential failures; and reviews results and obtains team concurrence. The "output" or result from this process is production requirements, procedures, and a control plan.

The next step 86 or "check" sub-phase consists of validating manufacturer concept readiness, obtaining management approval of process manufacturing concept readiness, developing a preliminary replication plan, reviewing the plan with customers, and conducting a milestone review.

The group validates manufacturing concept readiness by conducting a simulated production pilot run, measuring process potential using quality control metrics which are to be used in production, measuring product performance in dimensions as needed to ensure conformance to product requirements, and reviewing the results and obtaining team concurrence.

The group then obtains management approval of process manufacturing concept readiness. In the preferred embodiment, the group demonstrates the process to management, and provides managers with metrics and results including costs, timing, and quality estimates. The group then develops a preliminary replication plan and reviews the replication plan with customers. Particularly, the group recommends the sequence of replicating to other company facilities, and describes unique local requirements, by replication site identified. The "output" or result of these processes is management and customer concurrence of the preliminary replication plan.

The "output" or result 88 from phase 28 is a documented statistical metric in customer concurrence. The technology groups, teams and management also conduct a milestone review to review project status and milestone delivery poles and to ensure adherence to the quality operation system process 10. "AMTD" department managers, project leaders, project team members, customers, employee representatives all participate in the milestone review.

Figure 6:
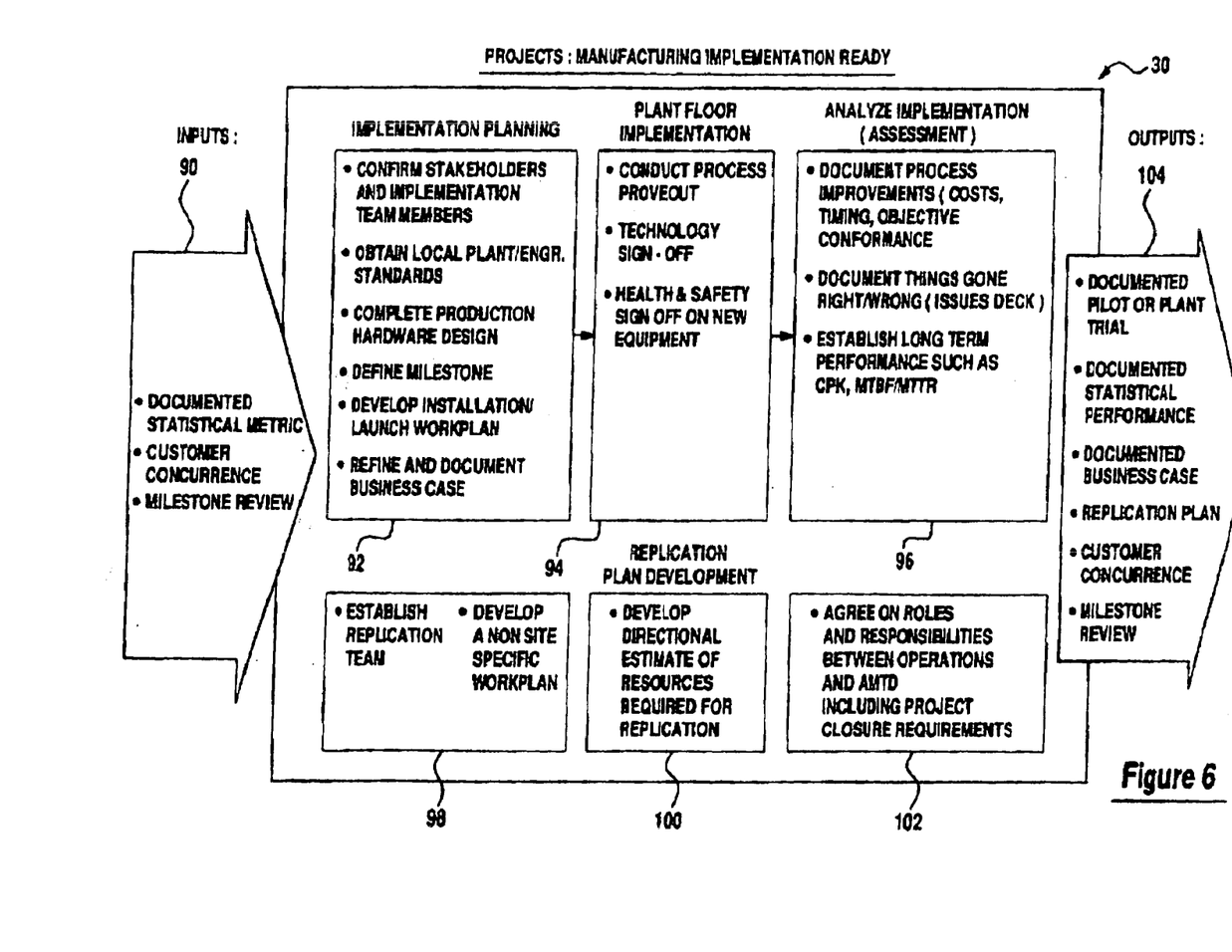
FIG. 6 is a block diagram illustrating a manufacturing implementation ready phase performed in the system or method shown in FIG. 1.

Referring now to FIG. 6, there is shown one non-limiting embodiment of the manufacturing implementation ready phase 30 of project 12. The manufacturing implementation ready phase 30 is the process of verifying and demonstrating that a piloted feasible technology is functionally sound and of sufficient quality/cost value to pursue within company plants or facilities (e.g., meets certain quality and cost criteria). In block or step 90, the "output" from phase 28 serves as the "input" for this phase 30. In step 92, the group or personnel (e.g., the group or employees in charge of this portion of the project) perform the implementation planning step or "sub-phase". The group begins by confirming stakeholders in this phase and implementation team members. Team members should include representation from the affected plant as well as suppliers of new or revised in-plant equipment. The team obtains local plant/engineering specifications affecting the process change, and reviews proposed changes with appropriate plant management. The group or team further completes production hardware and procedural design and development of specific plant and organizational requirements.

Next, the team defines preliminary milestones and a installation/launch workplan, and updates project timing chart. Particularly, the team completes failure mode analysis in accordance with company and "AMTD" guidelines to support an open launch documentation; verifies initial process conditions in an attempt to document the current process potential as appropriate; reviews launch timing; schedules launch with plant support; and releases purchase orders for the required equipment. At the end of "sub-phase" 92, the team refines and documents their findings. Particularly, the team provides a "business case" or an updated timing chart, launch plan and failure mode analysis.

In step 94, the plant floor implementation sub-phase, the team conducts a process "prove out", a technology sign-off, and a health and safety sign-off for new equipment. The team begins by conducting a process prove out. Particularly, the team establishes the existing procedural or process flow. In the preferred embodiment of the invention, this is performed by use of a graphical flow chart method to define the total process.

The team reviews failure mode analysis for effect on plant hardware and initiates failure mode analysis at the equipment manufacturer. The team then completes the building of equipment and assesses the process potential at the equipment manufacturer. The team runs a continuous equipment run-off on the manufacturing floor to assess engineering performance. If the equipment performs as desired, it is shipped and installed at the plant. Finally, the team establishes an issues deck to document new data that would be useful for replication planning.

The team then obtains a technology sign-off by the customer if the.process involves new technologies or uses measures that are unfamiliar with plant personnel. During this process or sub-step, the team also provides study materials to the safety engineer.

The team next obtains a health and safety sign-off for new equipment. Particularly, the team schedules and performs a safety sign-off on the manufacturer's floor. In the preferred embodiment, the plant safety engineer and employee representatives are key participants in this process. The "outputs" or results from step 94 are a process flow chart, the technology sign-off, and the manufacturing process potential.

Block or step 96, or the analyze implementation or assessment sub-phase, consists of documenting process improvements, documenting things gone right/wrong, and establishing long term performance criteria. Step 96 begins with the team documenting process improvements including cost, timing, and objective conformance, as well as product impact. The team next reviews things which have "gone right", things which have "gone wrong", and the issues deck with those charged to replicate the process. Process and company leadership is made aware of specific positive gains so the company's manufacturing business office can consider the same in the future programs. Finally, in step 96, the group establishes long-term performance criteria such as process potential ("Ppk"), process potential with customer concurrence ("Cpk"), mean time between failure ("MTBF"), and mean time to repair ("MTTR") for use with future plans.

In phase 30, the team or group further performs replication plan development in steps or sub-phases 98, 100 and 102. Particularly, the team performs the following actions: establishes replication team consisting of key technology developers and representatives from each of the replication sites; reviews pilot application with potential replication customers; develops a non-site specific (generic) workplan; revises the generic workplan to include unique requirements for each replication site; estimates human resources and skills required to replicate technology; develops directional estimate(s) of other resources required for replication; and agrees on roles and responsibilities between operations and manufacturing departments including project closure requirements.

The "output" or result 104 from phase 30 is a documented pilot or plant trial, documented statistical performance of the project, documented business case of the project, a replication plan, and customer concurrence. At the completion of phase 30, the technology groups, teams and management conduct a milestone review to review project status and milestone delivery poles and to ensure adherence to the quality operation system process 10. "AMTD" department managers, project leaders, project team members, customers, employee representatives all participate in the milestone review.

Figure 7:
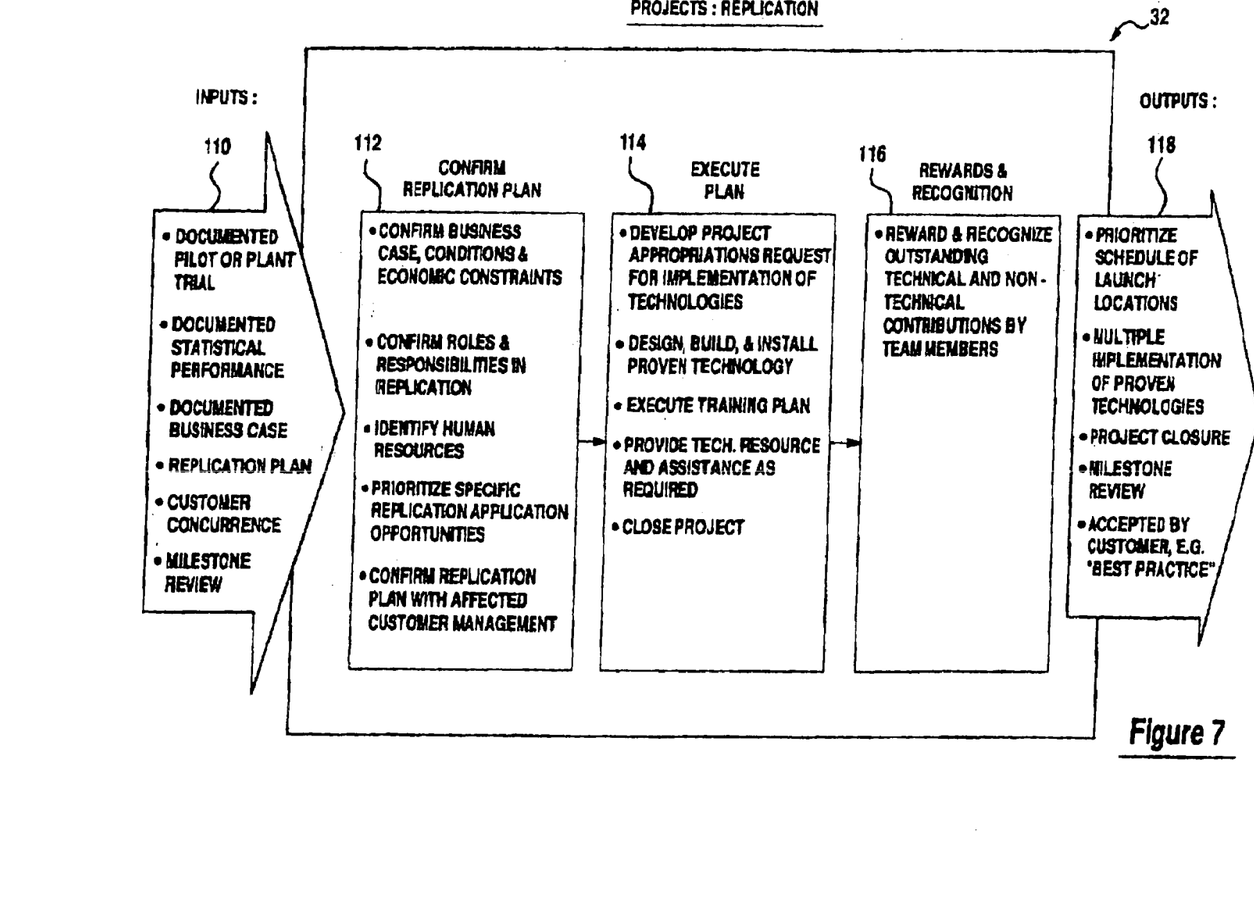
FIG. 7 is a block diagram illustrating a replication phase performed in the system or method shown in FIG. 1.

Referring now to FIG. 7, there is shown one non-limiting embodiment of the replication phase 32 of project 12. The replication phase 32 is the process of implementing multiple applications of proven technologies into company manufacturing and assembly operations. This phase 32 begins with a documented pilot or plant trial and is supported by the business case. It is expected that operations will lead replication with roles and responsibilities identified and confirmed. In block or step 110, the "output" from phase 28 serves as the "input" for this phase 32. In step 112, the team or group confirms the replication plan. Particularly, the team confirms the business case, conditions and economic constraints; calculates the project's pilot or plant tryout "time adjusted rate of return" ("TARR" ) and compares to the TARR to the company's TARR requirements; confirms effect of local requirements, at each proposed replication site, upon the business case; identifies any economic constraints and estimate the effects upon the proposed replication plan; and summarize the business case in terms of investment and total expected savings by cost category (e.g. labor, materials).

Once the business case conditions and economic restraints have been confirmed, the group or team confirms the ATMD department's roles and responsibilities in replication. It is expected that replication will be led by the appropriate operating activity with the ATMD department's roles and responsibilities defined on a case by case basis. In one non-limiting embodiment, during the replication process, it is the responsibility of the ATMD department team to: assure that the replication team members have a clear and full understanding of the technology; and assure that site-specific requirements are identified.

Once the ATMD department's roles and responsibilities have been confirmed, the team agrees with customer management on the deliverables required to close the AMTD project. The items considered in this process include: whether or not the project will no longer be an AMTD budgeted project; multiple implementation of the technology; and technology accepted as an operations "best practice", sub-system design specification, and standard operating practice.

Once agreement on AMTD project closure is effected, the team identifies human resources. Particularly, the team identifies skills required to implement the technology at each site; and assists in the development of training plans (and skills enhancement plans, as necessary) to assure that the appropriate knowledge is available at each site. The team then prioritizes specific replication application opportunities (e.g., by working with the customer to develop a prioritized listing of application opportunities considering such issues as business conditions, cycle plans, and available vendor resources). Finally, the team confirms the replication plan with affected customer management and obtain concurrence. The output or result of step or sub-phase 112 is a confirmed replication plan.

Step 114 or the "execute plan" sub-phase begins with the team or group providing technical assistance, as required, when the customer prepares site-specific project appropriations requests. The team further provides technical assistance, as required, during the design, build, and installation phases of a new technology; provides technical assistance, as required, during the execution of the training plans; and closes the project consistent with customer agreements. The "output" or result of sub-phase 114 is a successful application and project closure.

Phase 32 ends with step 116 or the rewards and recognition sub-phase. In step 116, the team rewards and recognizes outstanding technical and non-technical contributions by team members.

The "output" or result 118 from phase 30 is a documented pilot or plant trial, documented statistical performance of the project, the documented business case of the project, a replication plan, and customer concurrence. At the completion of phase 30, the technology groups, teams and management conduct a milestone review to review project status and milestone delivery poles and to ensure adherence to the quality operation system process 10. AMTD department managers, project leaders, project team members, customers, employee representatives all participate in the milestone review.

After phase 32, a project may be closed. Project closure may occur under two circumstances, either completion or termination. Project closure requires customer concurrence, either written or verbal. If verbal, a note to that effect stating the date and customer representative who requested closure is prepared signed and filed with the project records. Upon project closure, the AMTD project leader evaluates the remaining capital equipment used during the project's development and ensures proper asset disposition.

Figure 8:
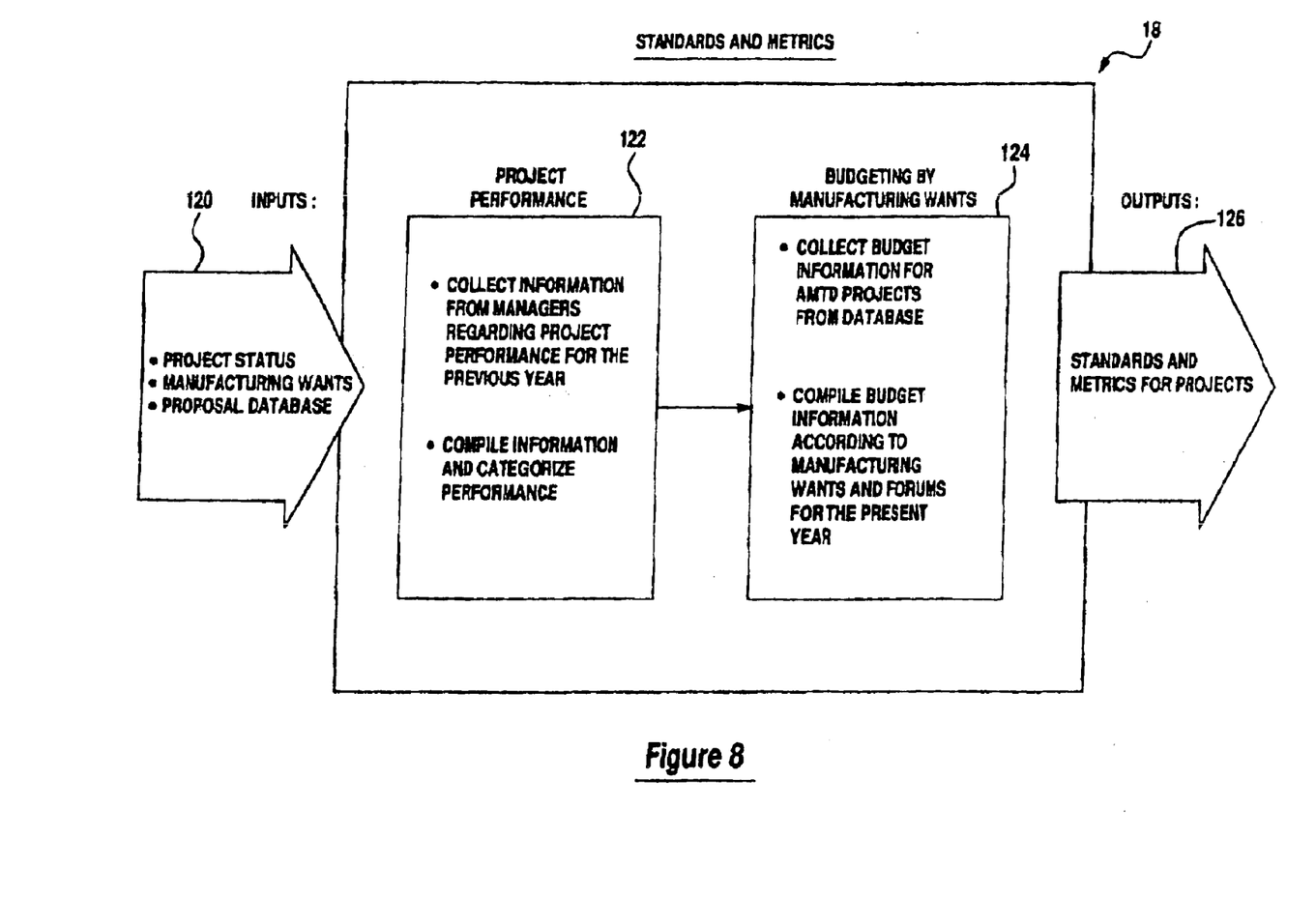
FIG. 8 is a block diagram illustrating a method for establishing logistic metrics which is utilized or performed by the system or method shown in FIG. 1.

Referring now to FIG. 8, there is shown a standards and metrics procedure which is used with the method 10 of the preferred embodiment. Standards and metrics method 18 is a procedure to establish logistic metrics for the development process pertaining to project performance and budgeting by manufacturing wants. The "inputs" 120 of the method 18 include the project status, manufacturing wants, and information from the proposal database and forums. Block or step 122 or the "project performance" step includes collecting information from managers regarding project performance for the previous year, compiling the information, and categorizing performance. Block or step 124 or the "budgeting by manufacturing wants" step includes collecting budget information for AMTD projects from the proposal database, and compiling budget information according to manufacturing wants and forums for the present year. Additionally, the project leader will maintain a chronological record identifying and documenting changes affecting the project records, including the review and approval of team members, as appropriate. "Outputs" 126 of the method 18 include standards and metrics for the projects 12.

Figure 9:
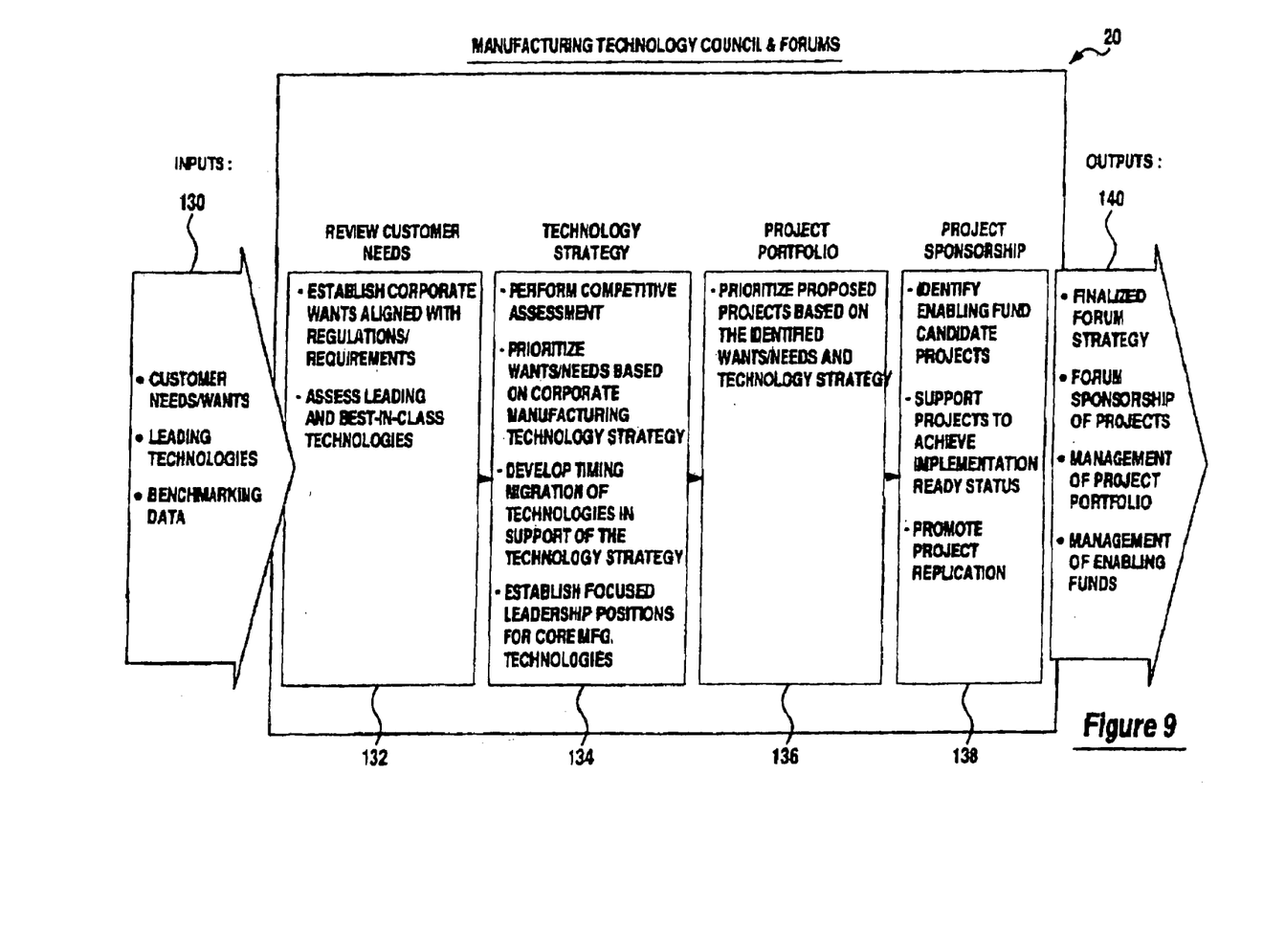
FIG. 9 is a block diagram illustrating a method for utilizing manufacturing technology councils and forums which is performed in the system or method shown in FIG. 1.

Referring now to FIG. 9 there is shown a method 20 for conducting manufacturing technology councils and forums. Manufacturing councils and forums are committees comprised of cross-functional representatives from various facets and levels of the company which are convened at a regular basis. The manufacturing technology councils and forums define the most effective strategies to advance the company's global manufacturing competitiveness. "Inputs" 130, which are used within these councils and forums, include data concerning customer needs and wants, leading technologies, and benchmarking. Process 20 begins in step 132 or the review customer needs step. In this step 132, the councils and/or forums establish corporate wants aligned with regulations and/or requirements, and assess the leading and "best-in-class" technologies. The next step 134 or the "technology strategy" step, includes performing competitive assessments; prioritizing wants and needs based on corporate manufacturing technology strategies (i.e., plans containing enabling product and manufacturing technologies that are required to deliver the technologies or feature necessary to support the advanced product and manufacturing needs); developing timing migration of technologies in support of the technology strategy; and establishing focused leadership positions for core manufacturing technologies. In the next "project portfolio" step 136, the councils and/or forums prioritize proposed projects based on the identified wants and needs and the technology strategies. In block or step 138 or the "project sponsorship" step, the committees identify enabling fund candidate projects, support projects to achieve implementation ready status, and promote project replication. Finally, the "outputs" 140 of this method 20 include a finalized forum strategy, a forum sponsorship of projects, management of project portfolios, and management of enabling funds.

Quality operating system of method 10 further includes a time and data management meetings step or procedure 22. Particularly, in this procedure, meetings regarding all of the foregoing procedures and processes are regularly planned and conducted by authorized and interested personnel.

It should be understood that Applicants' invention is not limited to the exact methods illustrated in FIGS. 1–9, but that various changes and/or modifications may be made without departing from the spirit and/or the scope of Applicants' invention. For example, in other embodiments of Applicants' invention, additional or different steps and procedures may be undertaken to further maximize the efficiency of project development performance and implementation.

What is claimed is:

1. A method for developing and performing a manufacturing project comprising the steps of:
    providing a communication mechanism for a plurality of users associated with the manufacturing project to efficiently communicate with each other;
    providing a plurality of electronic concept proposal worksheet files, wherein each of the plurality of electronic concept worksheet proposal files defines a selected concept proposal, and wherein each of the concept proposals formed initially from a non-implemented preliminary concept used to develop at least one of a manufacturing technology, a process and a methodology;
    selectively communicating the plurality of electronic concept worksheet proposal files to a plurality of users of the communication mechanism;
    modifying the electronic concept worksheet proposal files;
    entering the modified electronic concept worksheet proposal files into a proposal database;
    using the proposal database to generate at least one complete project proposal;
    performing a manufacturing concept ready procedure, effective to verify that said certain technology is capable of manufacturing said desired product under simulated conditions;
    performing a manufacturing implementation procedure, effective to verify that said certain technology is functionally sound and meets certain quality and cost criteria;
    developing a replication plan wherein the replication plan comprises the substeps of
        identifying a plurality of replication sites,
        developing a replication plan using the identified replication sites,
        establishing a replication team consisting of key technology developers and representatives from each of the replication sites, said replication team being led by an appropriate operating activity within an advanced manufacturing technology development (AMTD) department, wherein a plurality of AMTD departments roles and responsibilities are defined on a case by case basis,
        reviewing pilot application with potential replication customers,
        developing a generic non-site specific workplan,
        revising the generic non-site specific workplan to include unique requirements for each replication site wherein said unique requirements for each replication site are selected from projected intellectual property rights and regulatory requirements,
        estimating human resources and skills required to replicate technology,
        developing directional estimates of other resources required for replication, and
        agreeing on roles and responsibilities between operations and manufacturing departments including project closure requirements;
        prioritizing replication sites in accordance with a confirmed replication plan; and
    performing a replication procedure in accordance with the confirmed replication plan.

2. The method of claim 1 further comprising the step of:
assembling a workforce for performing said project.

3. The method of claim 2 further comprising the steps of:
providing orientation and communication processes for said workforce;
providing career development that advances the workforce along career paths to become technical specialists and training processes for said workforce; and
providing reward and recognition processes for said workforce, wherein the step of providing reward and recognition processes for said workforce further comprises recognizing technical and non-technical contributions by the team, wherein said awards are selected from at least one of technology awards, technical achievement awards, operational excellence awards, and patent incentive awards.

4. The method of claim 3 further comprising the step of:
performing a procedure to establish logistic metrics pertaining to project performance and budgeting.

5. The method of claim 4 further comprising the step of:
forming manufacturing technology committees; and convening said committees on a regular basis to define effective strategies to advance global manufacturing competitiveness.

6. The method of claim 5 wherein said project is related to the manufacture of an automotive vehicle.

7. The method of claim 1, wherein the substep of developing a replication plan using the identified replication site further comprises the steps of:
recommending the sequence of replicating within the identified replication sites;
describing unique local requirements for each identified replication site, wherein said unique requirements for each replication site are selected from projected intellectual property rights and regulatory requirements; and
establishing an issues deck to document new data that would be useful for replication planning.

8. The method of claim 1, further comprising the step of confirming a replication plan, wherein the step of confirming a replication plan further comprises the steps of:
confirming a business case, conditions and economic constraints;
calculating a proposed project's plan tryout "time adjusted rate of return" ("TARR");
comparing the TARR to the manufacturer's TARR requirements;
confirming effect of local requirements at each proposed replication site;
identifying any economic constraints;
estimating the effects of identified economic constraints upon the proposed replication plan; and
summarizing the business case in terms of investment and total expected savings by a cost labor category and a materials category.

9. The method of claim 1, wherein the step of prioritizing replication sites in accordance with a confirmed replication plan further comprises the step of:
developing a prioritized listing of replication sites using business conditions, cycle plans, and available vendor resources.

10. The method of claim 1, wherein the step of modifying the electronic concept worksheet proposal files further comprises the steps of:
finalizing project workplan information; and
refining estimate information for required resources and project benefits.

11. The method of claim 1, wherein the step of using the proposal database to generate at least one complete project proposal further comprises the step of:
submitting the modified electronic concept worksheet proposal files to an activity coordinator; and
comparing the modified electronic concept worksheet proposal files with timing rules, guidelines, and standards to ensure that the modified electronic concept worksheet proposal files meet associated timing rules, guidelines, and standards.

12. The method of claim 1 further comprising the steps of:
determining a plurality of potential failure modes of said replication plan, wherein the step of determining includes documenting said failure mode analysis based on long term performance criteria, wherein said long term performance criteria is selected from at least one of process potential, process potential with customer concurrence, a mean time between failures, and a mean time to repair;
determining a corresponding plurality of safeguards needed for protection against each of said plurality of potential failure modes for said replication plan; and
developing a plurality of production procedures to adjust to each of said plurality of potential failure modes.

13. A method for developing and performing a manufacturing project comprising the steps of:
providing a communication mechanism for a plurality of users associated with the manufacturing project to efficiently communicate with each other;
providing a plurality of concept proposals, wherein each of the concept proposals formed initially from a non-implemented preliminary concept used to develop at least one of a manufacturing technology, a process and a methodology;
providing a plurality of electronic concept proposal worksheet files, wherein each of the plurality of electronic concept worksheet proposal files defines a selected concept proposal;
selectively communicating the plurality of electronic concept worksheet proposal files to a plurality of users of the communication mechanism;
modifying the electronic concept worksheet proposal files;
entering the modified electronic concept worksheet proposal files into a proposal database;
using the proposal database to generate at least one complete project proposal; and
implementing multiple applications of said technology in manufacturing operations by performing the substeps of
identifying a plurality of replication sites,
developing a replication plan using the identified replication sites,
developing a generic non-site specific workplan;
revising the generic non-site specific workplan to include unique requirements for each replication site,
confirming a replication plan, wherein the step of confirming a replication plan further comprises the steps of:
confirming a business case, conditions and economic constraints;
calculating a proposed project's plan tryout "time adjusted rate of return" ("TARR");
comparing the TARR to the manufacturer's TARR requirements;
confirming effect of local requirements at each proposed replication site;
identifying any economic constraints;
estimating the effects of identified economic constraints upon the proposed replication plan; and
summarizing the business case in terms of investment and total expected savings by a cost labor category and a material category;

prioritizing replication sites in accordance with a confirmed replication plan, and performing a replication procedure in accordance with the confirmed replication plan.

14. The method of claim 13 further comprising the step of performing a milestone review meeting to insure that certain project issues have been accomplished after each step.

15. The method of claim 13 further comprising the step of:

reviewing technology, wherein said step of reviewing technology includes the substeps of identifying a best in class technology, wherein the best in class technology is an existing product or process that represents superior value to a customer relative to all similar products or processes, and identifying a state-of-the-art technology.

16. The method of claim 15 further comprising the step of:

convening committees on a regular basis to assess best in class technologies and state-of-the-art technologies.

17. The method of claim 16 further comprising the step of:

establishing logistic metrics relating to project performance and budgeting by manufacturing wants.

18. The method of claim 17 further comprising the step of:

conducting time and data management meetings.

19. The method of claim 18 wherein said manufacturing project relates to the production of an automotive vehicle.

20. The method of claim 13 wherein the previously non-implemented preliminary concept is created in response to a customer need.

* * * * *